United States Patent
Basu et al.

(10) Patent No.: US 11,784,329 B1
(45) Date of Patent: Oct. 10, 2023

(54) FUEL CELL SYSTEM INCLUDING AIR INLET BAFFLE AND METHOD OF OPERATING THEREOF

(71) Applicant: BLOOM ENERGY CORPORATION, San Jose, CA (US)

(72) Inventors: Nilanjana Basu, Santa Clara, CA (US); Nandan Joshi, Sunnyvale, CA (US); Hemant Gedam, Bangalore (IN); Kyle Kekelis, Oakland, CA (US); David Edmonston, Soquel, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/055,081

(22) Filed: Nov. 14, 2022

(51) Int. Cl.
| | | |
|---|---|---|
| *H01M 8/04014* | (2016.01) | |
| *H01M 8/04082* | (2016.01) | |
| *H01M 8/0662* | (2016.01) | |
| *H01M 8/1246* | (2016.01) | |
| *H01M 8/12* | (2016.01) | |
| *H01M 8/0432* | (2016.01) | |
| *H01M 8/2483* | (2016.01) | |
| *H01M 8/04701* | (2016.01) | |
| *H01M 8/2475* | (2016.01) | |
| *H01M 8/2485* | (2016.01) | |

(52) U.S. Cl.
CPC ... *H01M 8/04014* (2013.01); *H01M 8/04201* (2013.01); *H01M 8/0662* (2013.01); *H01M 8/1246* (2013.01); *H01M 8/04335* (2013.01); *H01M 8/04708* (2013.01); *H01M 8/2475* (2013.01); *H01M 8/2483* (2016.02); *H01M 8/2485* (2013.01); *H01M 2008/1293* (2013.01)

(58) Field of Classification Search
CPC ..... H01M 2008/1293; H01M 8/04014; H01M 8/04201; H01M 8/0662; H01M 8/1246; H01M 8/04268; H01M 8/04335; H01M 8/04395; H01M 8/04507; H01M 8/04708; H01M 8/04753; H01M 8/04798; H01M 8/2475; H01M 8/2483; H01M 8/2485
See application file for complete search history.

(56) References Cited

U.S. PATENT DOCUMENTS

| | | | |
|---|---|---|---|
| 8,877,399 B2 | 11/2014 | Weingaertner et al. | |
| 9,287,572 B2 | 3/2016 | Weingaertner et al. | |
| 10,957,921 B2 | 3/2021 | Weingaertner et al. | |
| 2015/0050573 A1* | 2/2015 | Yoshimine | H01M 8/04074 429/425 |
| 2020/0168922 A1 | 5/2020 | Weingaertner et al. | |
| 2020/0243885 A1 | 7/2020 | Weingaertner et al. | |

OTHER PUBLICATIONS

Office Communication, First Rectification Notification from China National Intellectual Property Administration ("CNIPA"), PRC (China) Patent Application No. 202223019328.7, dated Feb. 6, 2023, 1 page.

* cited by examiner

*Primary Examiner* — Matthew W Van Oudenaren
(74) *Attorney, Agent, or Firm* — THE MARBURY LAW GROUP PLLC (57) ABSTRACT

A fuel cell system includes a stack of fuel cells, a cathode recuperator configured to heat air using cathode exhaust output from the stack, and an air inlet baffle disposed between the cathode recuperator and the stack and containing at least two rows of apertures which are separated along a vertical direction and configured to provide the heated air output from the cathode recuperator to plural areas of the stack.

20 Claims, 9 Drawing Sheets

FUEL CELL SYSTEM INCLUDING AIR INLET BAFFLE AND METHOD OF OPERATING THEREOF

FIELD

Aspects of the present invention relate to electrochemical cell systems, and more particularly, to fuel cell systems including an air inlet baffle having apertures.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system includes a stack of fuel cells, a cathode recuperator configured to heat air using cathode exhaust output from the stack, and an air inlet baffle disposed between the cathode recuperator and the stack and containing at least two rows of apertures which are separated along a vertical direction and configured to provide the heated air output from the cathode recuperator to plural areas of the stack.

According to various embodiments, a method of operating a fuel cell system comprises providing heated air and fuel to a stack of fuel cells, operating the stack in a steady-state mode to output a fuel exhaust and an air exhaust, providing the fuel exhaust and the air exhaust to an anode tail gas oxidizer to oxidize the fuel exhaust, providing an exhaust from the anode tail gas oxidizer to a cathode recuperator, providing air to the cathode recuperator, heating the air using the exhaust from the anode tail gas oxidizer to output the heated air from the cathode recuperator onto an air inlet baffle disposed between the cathode recuperator and the stack and comprising at least two rows of apertures which are separated along a vertical direction, and providing the heated air through the at least two rows of apertures to plural areas of the stack.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/− 1% X. It will be further understood that the endpoints of each of the ranges are significant both in relation to the other endpoint, and independently of the other endpoint.

In a solid oxide fuel cell (SOFC) system, one or more fuel cell stacks may be provided with air and fuel in order to generate electricity. During operation, stacks may develop a vertical temperature gradient due to cell heat generation, convective cooling due to the incoming air, and/or radiative coupling between stacks and/or other system components. For example, fuel cells at the top and/or bottom of a stack may have a lower temperature than cells in the middle of the stack, and/or cells in the middle of the stack may be excessively cooled or heated. An excessive vertical temperature gradient may result in reduced voltage performance, thermal stress, cell degradation, and non-uniform fuel delivery, which may reduce overall system performance and/or efficiency. This may even lead to fuel starvation and associated failure of some fuel cells in the stack. Accordingly, embodiments of the present disclosure provide SOFC systems containing a perforated air inlet baffle that improves stack temperature variation and helps in optimizing the vertical stack temperature profile for uniform fuel flow to individual cells in a stack.

Figure 1:
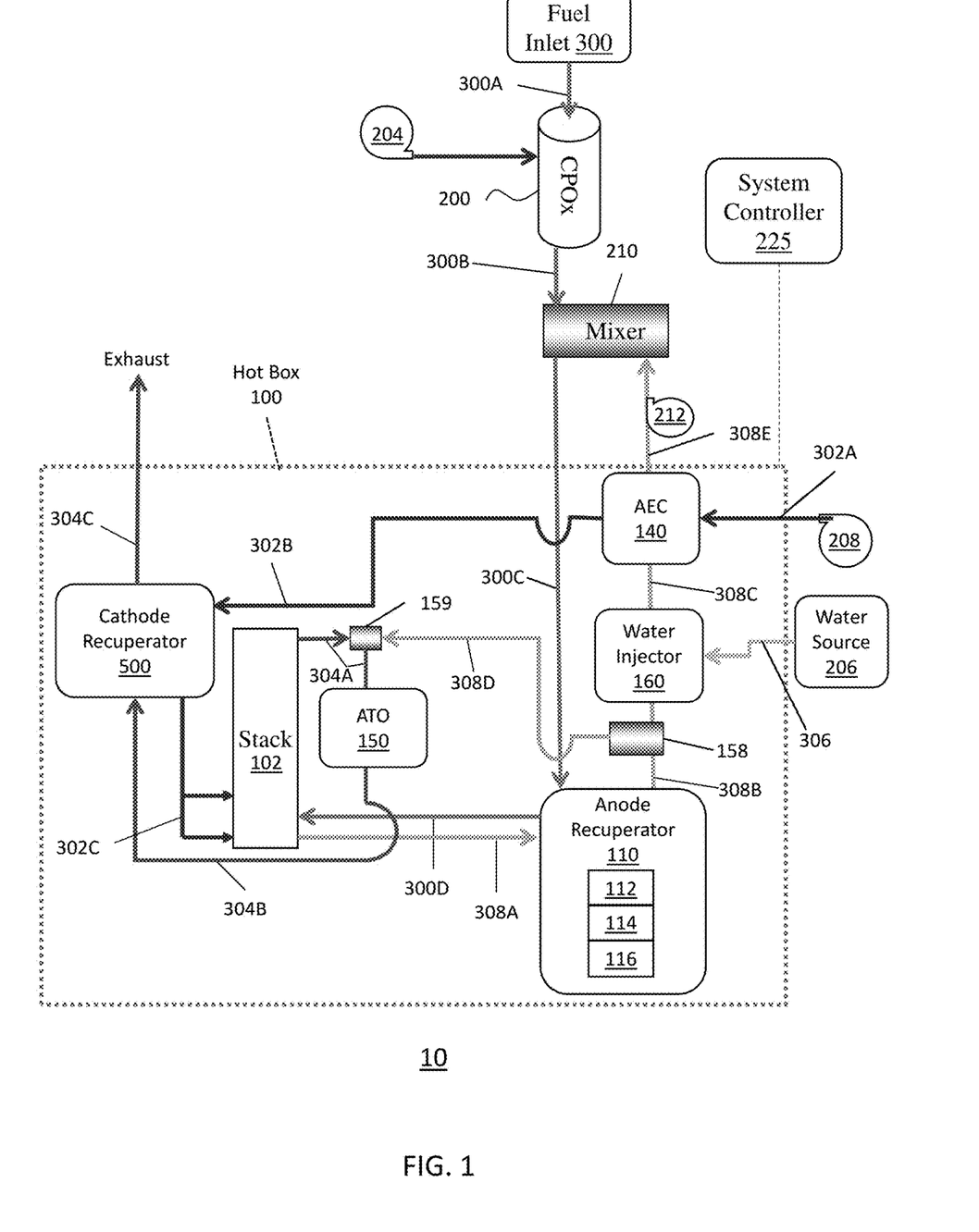
FIG. 1 is a schematic of a fuel cell system, according to various embodiments of the present disclosure.

FIG. 1 is a schematic representation of a SOFC system 10, according to various embodiments of the present disclosure. Referring to FIG. 1, the system 10 includes a hotbox 100 and various components disposed therein or adjacent thereto. The hot box 100 may contain stacks 102 containing alternating fuel cells, such as solid oxide fuel cells, and interconnects. One solid oxide fuel cell of the stack 102 contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be internally or externally manifolded for fuel.

The hot box 100 may also contain an anode recuperator heat exchanger 110, a cathode recuperator heat exchanger 500, an anode tail gas oxidizer (ATO) 150, an anode exhaust cooler heat exchanger 140, a splitter 158, a vortex generator 159, and a water injector 160. The system 10 may also include a catalytic partial oxidation (CPOx) reactor 200, a mixer 210, a CPOx blower 204 (e.g., air blower), a main air blower 208 (e.g., system blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a fuel tank or a utility natural gas line including a valve to control an amount of fuel provided to the CPOx reactor 200. The CPOx blower 204 may provide air to the CPOx reactor 200 during system start-up. The fuel and/or air may be provided to the mixer 210 by fuel conduit 300B. Fuel (e.g., the fuel inlet stream) flows from the mixer 210 to the anode recuperator 110 through fuel conduit 300C. The fuel is heated in the anode recuperator 110 by a portion of the fuel exhaust and the fuel then flows from the anode recuperator 110 to the stack 102 through fuel conduit 300D.

The main air blower 208 may be configured to provide an air stream (e.g., air inlet stream) to the anode exhaust cooler 140 through air conduit 302A. Air flows from the anode exhaust cooler 140 to the cathode recuperator 500 through air conduit 302B. The air is heated by the ATO exhaust in the cathode recuperator 500. The air flows from the cathode recuperator 500 to the stack 102 through air conduit 302C.

An anode exhaust stream (e.g., the fuel exhaust stream) generated in the stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to the splitter 158 by anode exhaust conduit 308B. A first portion of the anode exhaust may be provided from the splitter 158 to the anode exhaust cooler 140 through the water injector 160 and the anode exhaust conduit 308C. A second portion of the anode exhaust is provided from the splitter 158 to the ATO 150 through the anode exhaust conduit 308D. The first portion of the anode exhaust heats the air inlet stream in the anode exhaust cooler 140 and may then be provided from the anode exhaust cooler 140 to the mixer 210 through the anode exhaust conduit 308E. The anode recycle blower 212 may be configured to move anode exhaust though anode exhaust conduit 308E, as discussed below.

Cathode exhaust generated in the stack 102 flows to the ATO 150 through exhaust conduit 304A. The vortex generator 159 may be disposed in exhaust conduit 304A and may be configured to swirl the cathode exhaust. The anode exhaust conduit 308D may be fluidly connected to the vortex generator 159 or to the cathode exhaust conduit 304A or the ATO 150 downstream of the vortex generator 159. The swirled cathode exhaust may mix with the second portion of the anode exhaust provided by the splitter 158 before being provided to the ATO 150. The mixture may be oxidized in the ATO 150 to generate an ATO exhaust. The ATO exhaust flows from the ATO 150 to the cathode recuperator 500 through exhaust conduit 304B. Exhaust flows from the cathode recuperator and out of the hotbox 100 through exhaust conduit 304C.

Water flows from a water source 206, such as a water tank or a water pipe, to the water injector 160 through water conduit 306. The water injector 160 injects water directly into first portion of the anode exhaust provided in anode exhaust conduit 308C. Heat from the first portion of the anode exhaust (also referred to as a recycled anode exhaust stream) provided in anode exhaust conduit 308C vaporizes the water to generate steam. The steam mixes with the anode exhaust, and the resultant mixture is provided to the anode exhaust cooler 140. The mixture is then provided from the anode exhaust cooler 140 to the mixer 210 through the anode exhaust conduit 308E. The mixer 210 is configured to mix the steam and first portion of the anode exhaust with fresh fuel (i.e., fuel inlet stream). This humidified fuel mixture may then be heated in the anode recuperator 110 by the anode exhaust, before being provided to the stack 102. The system 10 may also include one or more fuel reforming catalysts 112, 114, and 116 located inside and/or downstream of the anode recuperator 110. The reforming catalyst(s) reform the humidified fuel mixture before it is provided to the stack 102.

The system 10 may further a system controller 225 configured to control various elements of the system 10. The controller 225 may include a central processing unit configured to execute stored instructions. For example, the controller 225 may be configured to control fuel and/or air flow through the system 10, according to fuel composition data.

Figures 2A, 2B:
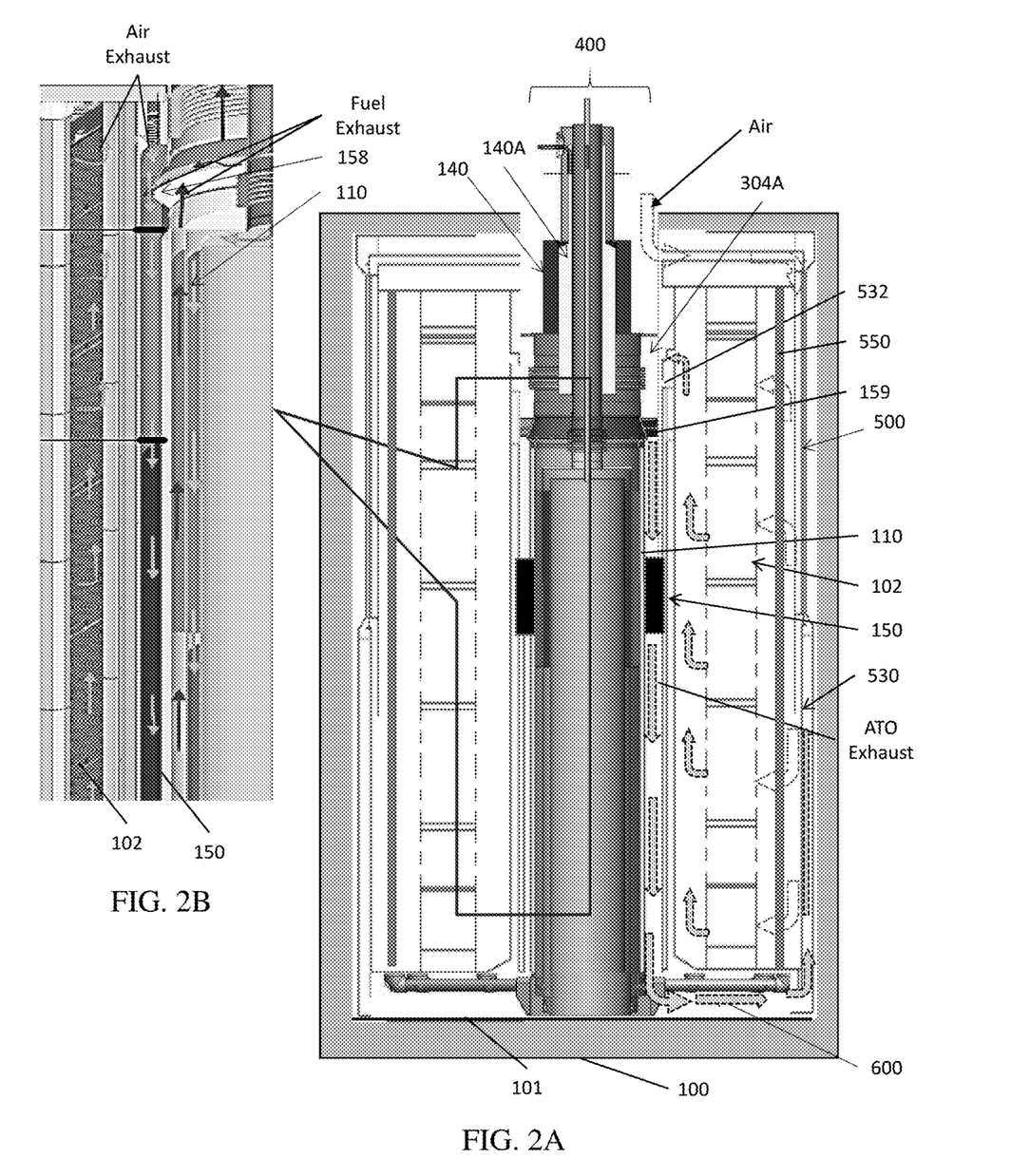
FIG. 2A is a sectional view showing components of the hot box of the system of FIG. 1.
FIG. 2B shows an enlarged portion of the system of FIG. 2A.
Figure 2C:
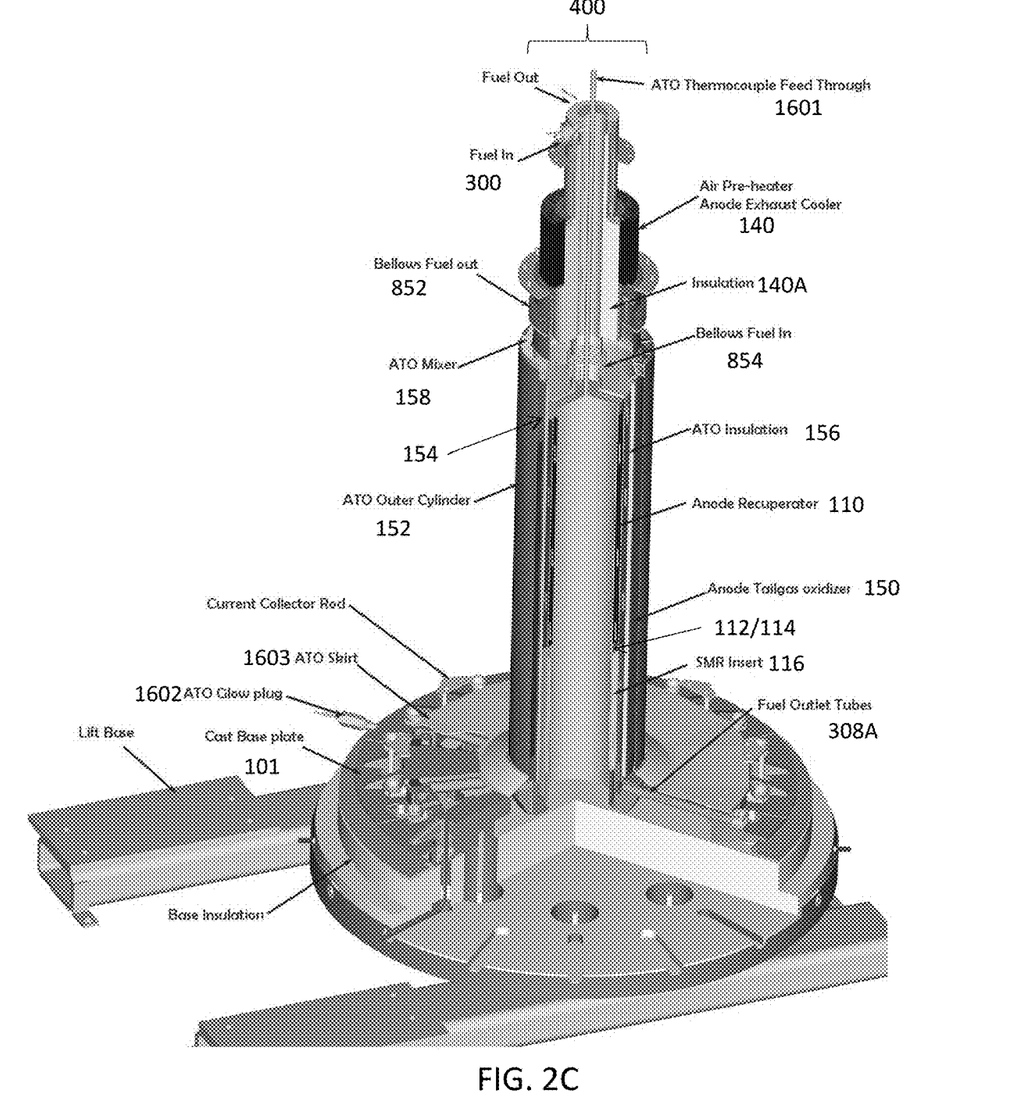
FIG. 2C is a three-dimensional cut-away view of a central column of the system of FIG. 2A.
Figure 2D:
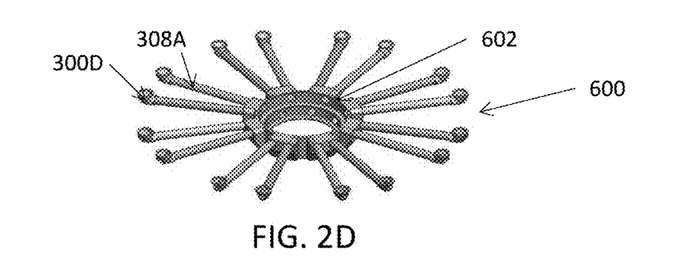
FIG. 2D is a perspective view of an anode hub structure disposed below the central column of the system of FIG. 2A, according to various embodiments of the present disclosure.

FIG. 2A is a sectional view showing components of the hot box 100 of the system 10 of FIG. 1, and FIG. 2B shows an enlarged portion of FIG. 2A. FIG. 2C is a three-dimensional cut-away view of a central column 400 of the system 10, according to various embodiments of the present disclosure, and FIG. 2D is a perspective view of an anode hub structure 600 disposed in a hot box base 101 on which the column 400 may be disposed.

Referring to FIGS. 2A-2D, the fuel cell stacks 102 may be disposed around the central column 400 in the hot box 100. For example, the stacks 102 may be disposed in a ring configuration around the central column 400 and may be positioned on the hot box base 101. The column 400 may include the anode recuperator 110, the ATO 150, and the anode exhaust cooler 140. In particular, the anode recuperator 110 is disposed radially inward of the ATO 150, and the anode exhaust cooler 140 is mounted over the anode recuperator 110 and the ATO 150. In one embodiment, an oxidation catalyst 112 and/or the hydrogenation catalyst 114 may be located in the anode recuperator 110. A reforming catalyst 116 may also be located at the bottom of the anode recuperator 110 as a steam methane reformation (SMR) insert.

The ATO 150 comprises an outer cylinder 152 that is positioned around the outer wall of the anode recuperator 110. Optionally, ATO insulation 156 may be enclosed by an ATO inner cylinder 154. Thus, the insulation 156 may be located between the anode recuperator 110 and the ATO 150. An ATO oxidation catalyst may be located in the space between the outer cylinder 152 and the ATO insulation 156. A fuel inlet path bellows 854 may be located between the anode exhaust cooler 140 and the inner ATO cylinder 154. An ATO thermocouple feed through 1601 extends through the anode exhaust cooler 140, to the top of the ATO 150. The temperature of the ATO 150 may thereby be monitored by inserting one or more thermocouples (not shown) through this feed through 1601.

The anode hub structure 600 may be positioned under the anode recuperator 110 and ATO 150 and over the hot box base 101. The anode hub structure 600 is covered by an ATO skirt 1603. The vortex generator 159 and fuel exhaust splitter 158 are located over the anode recuperator 110 and ATO 150 and below the anode exhaust cooler 140. An ATO glow plug 1602, which initiates the oxidation of the stack fuel exhaust in the ATO during startup, may be located near the bottom of the ATO 150.

The anode hub structure 600 is used to distribute fuel evenly from the central column to fuel cell stacks 102 disposed around the central column 400. The anode flow hub structure 600 includes a grooved cast base 602 and a "spider" hub of fuel inlet conduits 300D and anode exhaust conduits 308A. Each pair of conduits 300D, 308A connects to a fuel cell stack 102. Anode side cylinders (e.g., anode recuperator 110 inner and outer cylinders and ATO outer cylinder 152) are then welded or brazed into the grooves in the base 602, creating a uniform volume cross section for flow distribution as discussed below.

As shown by the arrows in FIGS. 2A and 2B, air enters the top of the hot box 100 and then flows into the cathode recuperator 500 where it is heated by ATO exhaust output from the ATO 150. The heated air then flows through the cathode recuperator 500 and then exits the cathode recuperator 500 through an air outlet 530. An air inlet baffle 550 may be disposed between the stacks 102 and the cathode recuperator 500. As discussed in detail below, the air inlet baffle 550 may be configured to control air flow to the stacks 102.

For solid oxide fuel cells, the air then flows through the stacks 102, such that oxygen ions diffuse from the cathode electrodes through the fuel cell electrolytes to the anode electrodes and react with fuel (i.e., fuel inlet stream) provided from the anode hub structure 600 at the anode electrodes of the fuel cells. Air exhaust flows from the stacks 102 and then passes through vanes of the vortex generator 159 and is swirled before entering the ATO 150.

The splitter 158 may direct the second portion of the fuel exhaust exiting the top of the anode recuperator 100 through openings (e.g., slits) in the splitter into the swirled air exhaust (e.g., in the vortex generator 159 or downstream of the vortex generator 159 in exhaust conduit 304A or in the ATO 150). At such the fuel and air exhaust may be mixed before entering the ATO 150.

Figure 3A:
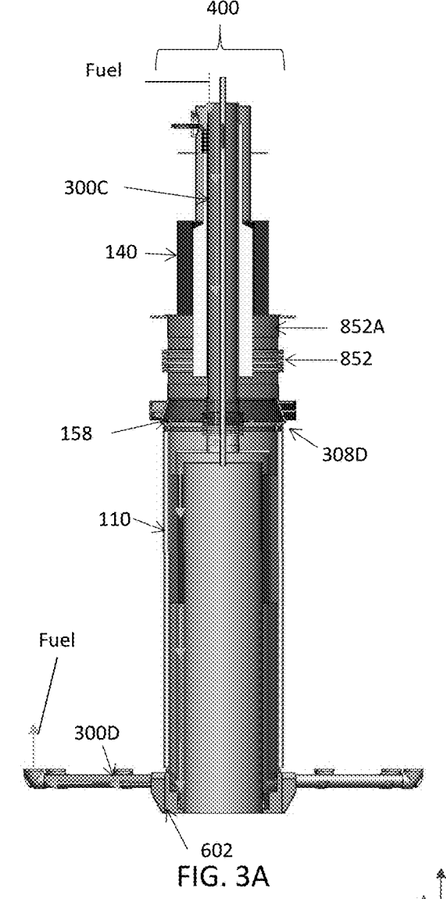
FIGS. 3A-3C are sectional views showing fuel and air flow through the central column of the system of FIG. 2A, according to various embodiments of the present disclosure.
Figure 3B:
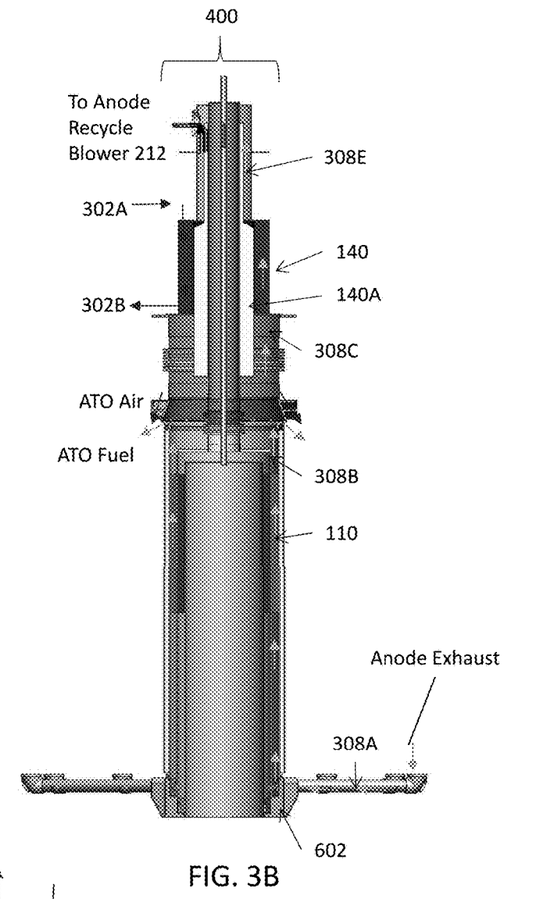
Figure 3C:
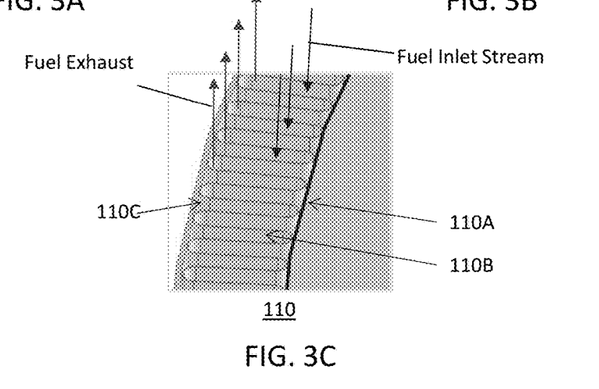

FIGS. 3A and 3B are side cross-sectional views showing flow distribution through the central column 400, and 3C is top cross-sectional view taken through the anode recuperator 110. Referring to FIGS. 2A, 2B, 3A, and 3C, the anode recuperator 110 includes an inner cylinder 110A, a corrugated plate 110B, and an outer cylinder 110C that may be coated with the ATO insulation 156. Fuel from fuel conduit 300C enters the top of the central column 400. The fuel then bypasses the anode exhaust cooler 140 by flowing through its hollow core and then flows through the anode recuperator 110, between the outer cylinder 110C and the and the corrugated plate 110B. The fuel then flows through the hub base 602 and conduits 300D of the anode hub structure 600 shown in FIG. 3B, to the stacks 102.

Referring to FIGS. 2A, 2B, 2C, 3A, and 3B, the fuel exhaust flows from the stacks 102 through conduits 308A into the hub base 602, and from the hub base 602 through the anode recuperator 110, between in inner cylinder 110A and the corrugated plate 110B, and through anode exhaust conduit 308B into the splitter 158. The first portion of the fuel exhaust flows from the splitter 158 to the anode exhaust cooler 140 through anode exhaust conduit 308C, while the second portion flows from the splitter 158 to the ATO 150 through anode exhaust conduit 308D, as shown in FIG. 1. Anode exhaust cooler inner core insulation 140A may be located between the fuel conduit 300C and bellows 852/ supporting cylinder 852A located between the anode exhaust cooler 140 and the vortex generator 159, as shown in FIG. 3A. This insulation minimizes heat transfer and loss from the first portion of the anode exhaust stream in anode exhaust conduit 308C on the way to the anode exhaust cooler 140. Insulation 140A may also be located between fuel conduit 300C and the anode exhaust cooler 140 to avoid heat transfer between the fuel inlet stream in conduit 300C and the streams in the anode exhaust cooler 140. In other embodiments, insulation 140A may be omitted from inside the cylindrical anode exhaust cooler 140.

FIG. 3B also shows air flowing from the air conduit 302A to the anode exhaust cooler 140 (where it is heated by the first portion of the anode exhaust) and then from the anode exhaust cooler 140 through conduit 302B to the cathode recuperator 500. The first portion of the anode exhaust is cooled in the anode exhaust cooler 140 by the air flowing through the anode exhaust cooler 140. The cooled first portion of the anode exhaust is then provided from the anode exhaust cooler 140 to the anode recycle blower 212 shown in FIG. 1.

As will be described in more detail below and as shown in FIGS. 2A and 3B, the anode exhaust exits the anode recuperator 110 and is provided into splitter 158 through anode exhaust conduit 308B. The splitter 158 splits the anode exhaust into first and second anode exhaust portions (i.e., streams). The first stream is provided into the anode exhaust cooler 140 through anode exhaust conduit 308C. The second stream is provided to the ATO 150 through anode exhaust conduit 308D.

The relative amounts of anode exhaust provided to the ATO 150 and the anode exhaust cooler 140 is controlled by the anode recycle blower 212. The higher the blower 212 speed, the larger portion of the anode exhaust is provided into anode exhaust conduit 308C and a smaller portion of the anode exhaust is provided to the ATO 150 via anode exhaust conduit 308D, and vice-versa. The anode exhaust provided to the ATO 150 may be oxidized by the stack cathode (i.e., air) exhaust and provided to the cathode recuperator 500 through conduit 304B.

Figure 4A:
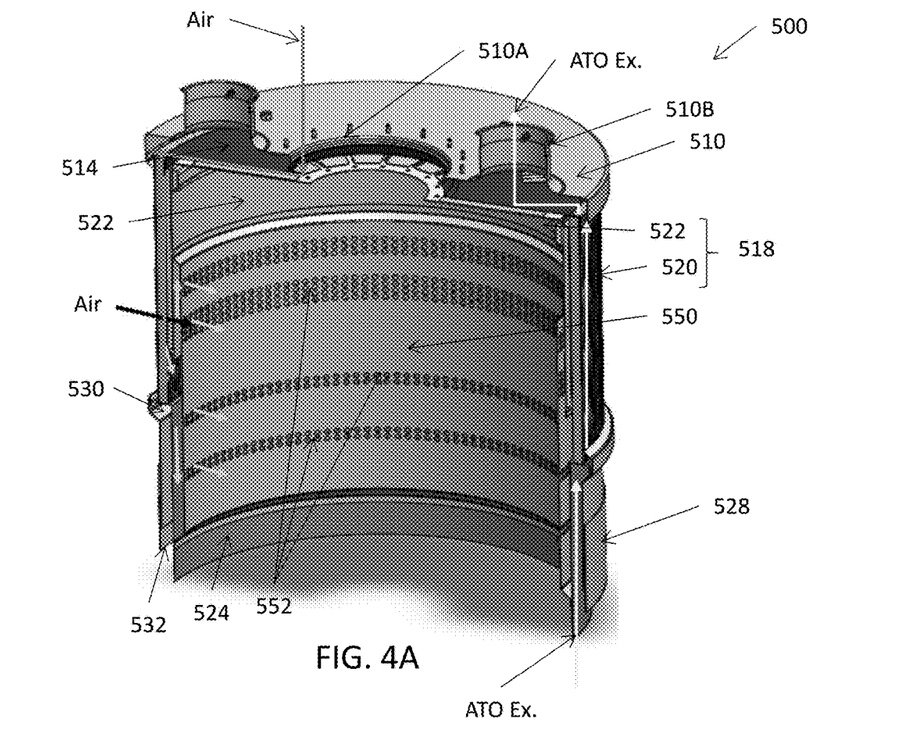
FIG. 4A is a cross-sectional view showing the air inlet baffle disposed inside of the cathode recuperator.
Figure 4B:
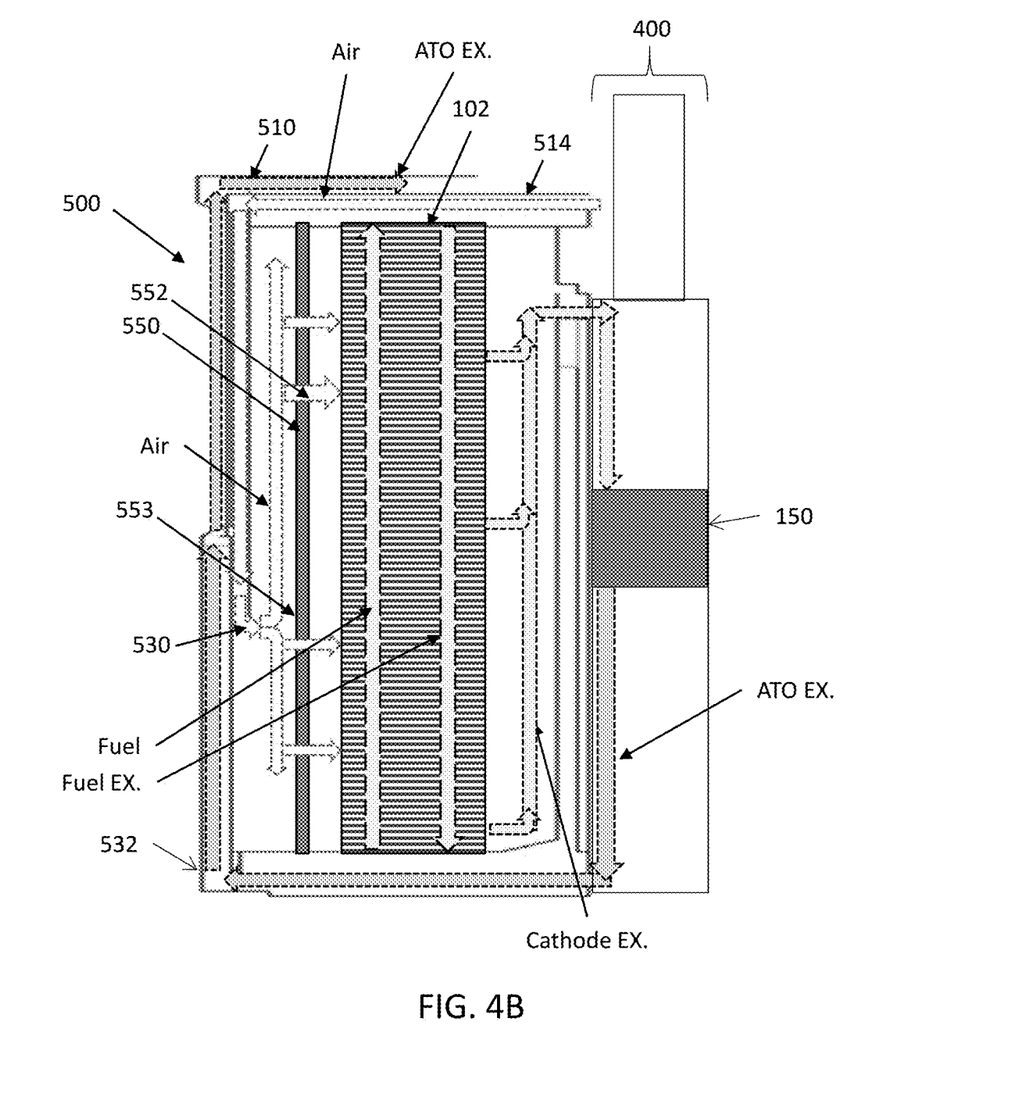
FIG. 4B is simplified partial cross-sectional view showing air and exhaust flow through the cathode recuperator, a stack, and a central column.
Figure 4C:
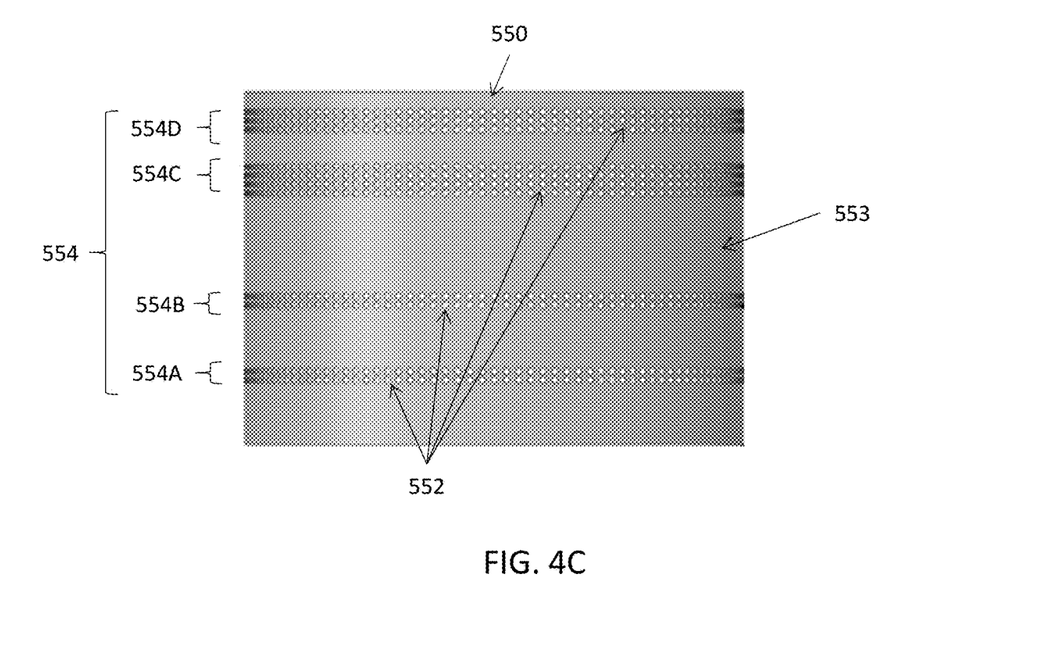
FIG. 4C is a side view of the air inlet baffle of FIG. 4A.

FIG. 4A is a cross-sectional view showing the air inlet baffle 550 disposed inside of the cathode recuperator 500, FIG. 4B is simplified partial cross-sectional view showing air and exhaust flow through the cathode recuperator 500, stack 102, and a central column 400, and FIG. 4C is a side view of the air inlet baffle 550.

Referring to FIGS. 4A-4C, the cathode recuperator 500 may surround one or more of the stacks 102 and the central column 400 which is shown in more detail in FIG. 2A. The cathode recuperator 500 may include a cover 510 including an air inlet 510A and air exhaust outlets 510B, an upper lid 514, an optional fin assembly 518, a lower cylinder 524 and an outer shell 528. The fin assembly 518 may include a cylindrical corrugated plate 520 and an inner wall 522 disposed inside of the corrugated plate 520. The corrugated plate 520 may be configured to transfer heat between incoming air and outgoing cathode exhaust. The inner surface of the inner wall 522 may be covered with heat shield insulation.

An annular air outlet 530 may be formed between the inner wall 522 and the lower cylinder 524. In particular, the air outlet 530 may be formed where the lower cylinder 524 and the inner wall 522 overlap. An annular ATO exhaust inlet 532 may be formed between the outer shell 528 and the lower cylinder 524.

As shown in FIGS. 4A and 4B, air may enter the cathode recuperator 500 through the air inlet 510A, flow under the upper lid 514, along an inner surface of the corrugated plate 520, and then out of the air outlet 530. The air may then pass through the air inlet baffle 550 and be provided to the fuel cell stacks 102 which are surrounded by the cathode recuperator 500. Cathode exhaust output from the stack 102 may flow into the central column 400, be mixed with anode exhaust (not shown) in the vortex generator 159, and then provided to the ATO 150. ATO exhaust (i.e., oxidized fuel exhaust) output from the ATO 150 may be provided to the ATO exhaust inlet 532 of the cathode recuperator 500, flow along an outer surface of the corrugated plate 520 and over an upper surface of the upper lid 514, before exiting through the exhaust outlets 510B. Accordingly, the air is heated by heat extracted from the ATO exhaust.

The air inlet baffle 550 may be a cylindrical component disposed inside of the cathode recuperator 500, and surrounding the fuel cell stacks 102. The air inlet baffle may form a barrier between the fuel cell stacks 102 from the cathode recuperator 500. The air inlet baffle 550 may be configured to control the flow of the heated air to the fuel cell stacks 102, in order to limit the vertical temperature variations along the height of the fuel cell stacks 102 and also to optimize it to be favorable for uniform fuel utilization across the cells. For example, during steady-state operation of the system (which occurs after start-up operation of the system), the air inlet baffle 550 may be configured to provide a vertical cell-to-cell temperature variation in the fuel cell stack 102 of about 40° C. or less, such from about 30° C. to about 40° C. In some embodiments, during steady-state operation of the system, the air inlet baffle 550 may be configured to control the temperature of the fuel cell stacks 102, such that a maximum fuel utilization of any fuel cell in the stack 102 is about 1% or less above the average fuel utilization of the entire fuel cell stack 102, such as 0.1 to 1% above the average fuel utilization. In some embodiments, the air inlet baffle 550 may be configured to control the temperature of the stacks 102, such that the fuel utilization of the fuel cells in the stack 102 ranges from about 86% to about 91%. Thus, the difference between the minimum and maximum fuel utilization between the two different fuel cells in the same stack is 10% or less, such as 5% or less, such as 4 to 6%.

The air inlet baffle 550 may include an array of apertures 552 configured to direct heated air towards particular portions of the stacks 102. For example, in some embodiments, the apertures 552 may be arranged on the air inlet baffle 550, such that the air inlet baffle directs more of the air output from the cathode recuperator 500 to a top portion of the stack 102 than to a bottom portion of the stack 102.

In some embodiments the apertures 552 may be circular through holes, as shown in FIG. 4C. However, in other embodiments the apertures 552 may have other shapes, such as horizontal or vertical slits, or the like. The location, size, and/or number of the apertures 552 may be set according to desired stack 102 and/or system characteristics influenced by air provided through the air inlet baffle 550.

In one embodiment, the air inlet baffle 550 may lack any apertures 552 at the vertical level of the air outlet 530. Thus, air exiting the air outlet 530 is incident on a solid plate portion 553 of the air inlet baffle 550 and is not provided directly to the fuel cell stacks 102. Thus, portions of the fuel cell stacks 102 located at the vertical level of the air outlet 530 are not subjected to overcooling from a direct impact of the air stream provided from the air outlet 530. Thus, the solid plate portion 553 of the air inlet baffle 550 spreads (i.e., deflects) the air exiting the air outlet 530 in the vertical direction (i.e., up and down) before the air reaches the fuel cell stacks 102 through the apertures 552. Thus, the air achieves a more uniform temperature by flowing vertically before reaching the stacks 102. Furthermore, since the air is incident on several vertical portions of the stacks 102 which are located at the vertical levels of the apertures, a single region of the stack 102 is not subject to overcooling from the air stream. This provides a more uniform vertical temperature distribution along the height of the stack 102.

Fuel provided to the fuel cells flows from the bottom of the stack to the top of the stack 102, and fuel exhaust from the fuel cells flows through the stack 102 in the opposite direction, either through riser tubes or through an integrated fuel channels within the fuel cell stack 102. Fuel distribution may be governed by the geometry of the stack 102, as well as variations in the properties of the fuel with the stack 102, due to local temperature variations in the stack 102. For example, higher fuel temperatures may result increased fuel flow resistance, which may result in reduced fuel flow rates. Vertical stack temperature variations may result from variations in fuel cell heat generation, convective cooling of a stack by incoming air, as well as radiation coupling between a stack and other heat generating components of a SOFC system.

Figure 5:
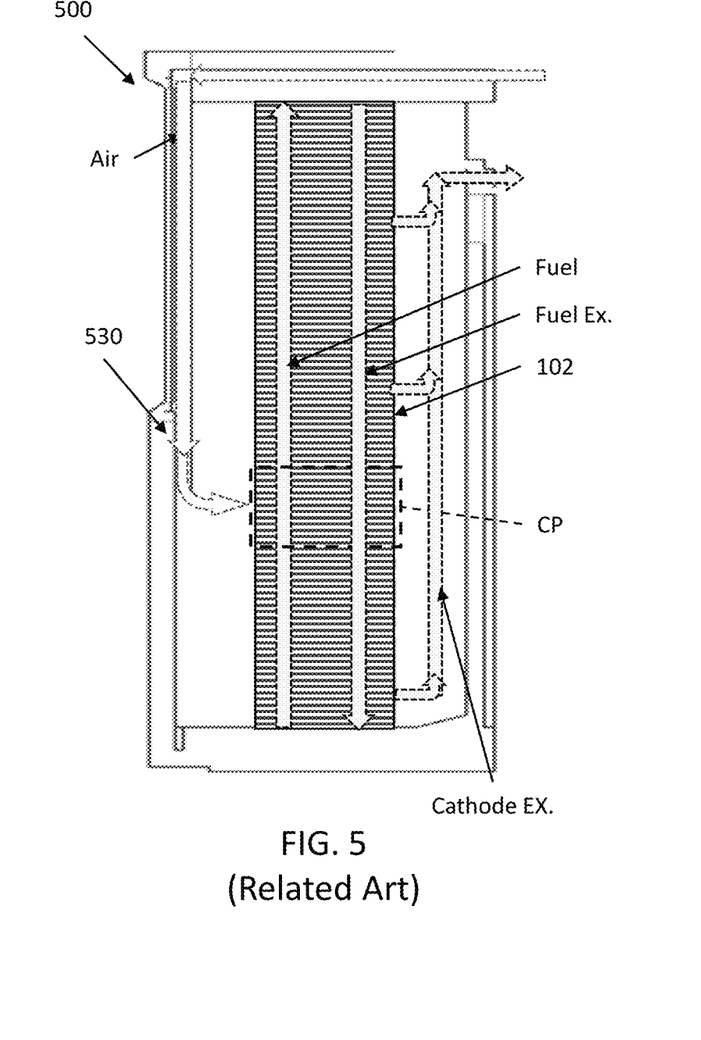
FIG. 5 is simplified cross-sectional view showing air distribution from cathode recuperator 500 to a stack, in a comparative fuel cell system that does not include an air inlet baffle.

For example, FIG. 5 is simplified cross-sectional view showing air distribution from cathode recuperator 500 to a stack 102, in a comparative fuel cell system that does not include the air inlet baffle. As shown in FIG. 5, air exits the cathode recuperator 500 through the air outlet 530 and is initially directed to fuel cells in a central portion CP of the stack 102. As a result, the stack 102 may experience an uneven vertical temperature profile, due to cooling of the fuel cells in the central portion CP by the incoming air.

In contrast, as descried above with regard to FIGS. 4A-4C, in one embodiment, portions of the fuel cell stacks 102 located at the vertical level of the air outlet 530 are not subjected to overcooling from a direct impact of the air stream provided from the air outlet 530. Thus, the solid plate portion 553 of the air inlet baffle 550 spreads (i.e., deflects) the air exiting the air outlet 530 in the vertical direction (i.e., up and down) before the air reaches the fuel cell stacks 102 through the apertures 552. Thus, the air achieves a more uniform temperature by flowing vertically before reaching the stacks 102. Furthermore, even if there are apertures 552 at the vertical level of the air outlet 5230, since the air is incident on several vertical portions of the stacks 102 which are located at the vertical levels of the apertures 552, a single region of the stack 102 is not subject to overcooling from the air stream. This provides a more uniform vertical temperature distribution along the height of the stack 102.

The present inventors determined that reducing vertical temperature variations within stacks may provide better cell temperature control, voltage performance, and voltage uniformity, and may reduce cell degradation and reduced thermal stress, over various operating conditions. Additionally, an optimum vertical stack temperature profile increases the uniformity of fuel flow to the fuel cells in a stack, in the vertical direction. Fuel cells may degrade and/or fail at excessively high fuel utilization rates, due to fuel cell starvation. The maximum fuel utilization in a cell within a stack may be a factor in determining the overall fuel utilization rate and system efficiency.

For example, referring again to FIG. 4C, a high number of small-diameter apertures 552 may minimize a pressure drop and parasitic losses from the air blower providing air to the cathode recuperator 500. A high number of small-diameter apertures 552 may also prevent and/or reduce high velocity air jets from impinging upon the stacks 102 directly, which may decrease damage to the stack and more smoothly distribute the incoming air into an air inlet plenum surrounding the stacks 102.

Accordingly, the number, diameter, and/or spacing of the apertures 552 in each array 554, and/or the arrangement of the arrays 554, may be selected to provide desired stack characteristics, such as stack temperature profile and corresponding fuel utilization. For example, the apertures 552 of the air inlet baffle 550 may be arranged in one or more annular arrays 554 which are vertically separated from each other by a respective solid plate portion 553 which lacks any apertures. For example, the apertures 552 may be arranged in a first array 554A, a second array 554B, a third array 554C, and a fourth array 554D. However, the present disclosure is not limited to any particular number of arrays 554. For example, each array 554 may include at least one row of apertures 552, such as from 1 to 10 rows of apertures 552, from 2 to 8 rows of apertures 552, or from 2 to 5 rows of apertures 552.

In some embodiments, the first and second arrays 554A, 554B are disposed below the annular air outlet 530, while the third and fourth arrays 554C, 554D are disposed above the annular air outlet 530. In some embodiments, the third and fourth arrays 554C, 554D may include more rows of apertures 552 than the first and second arrays 554A, 554B, and the third array 554C may include more rows of apertures 552 than the fourth array 554D. Accordingly, the air inlet baffle 550 may provide more air flow to an upper end of a stack than a lower end thereof.

The apertures 552 may have a diameter ranging from about 2 mm to about 20 mm, such as from about 5 mm to about 15 mm. The apertures 552 of each row may have a center-to-center horizontal spacing ranging from about 2 mm to about 20 mm, such as from about 5 mm to about 15 mm. The apertures 552 of adjacent rows may have a vertical center-to-center spacing ranging from about 2 mm to about 20 mm, such as from about 5 mm to about 14 mm.

In some embodiments, the first array 554A may be disposed from about 130 mm to about 150 mm from the bottom of the air inlet baffle plate 550. The second array 554B may be disposed from about 240 mm to about 265 mm from the bottom of the air inlet baffle plate 550. The third array 554C may be disposed from about 410 mm to about 435 mm from the bottom of the air inlet baffle plate 550. The fourth array 554D may be disposed from about 500 mm to about 525 mm from the bottom of the air inlet baffle plate 550.

Initial column/stack fuel distribution (CFD) modeling predicts that a linear temperature profile with a difference of about 20° C., with hotter temperatures at the bottom than at the top of the stack or column, would provide improved fuel delivery uniformity. In order to provide a high fuel cell fuel utilization rate, low cell-to-cell fuel utilization rate variations, and a high overall system efficiency, the maximum fuel utilization rate in any cell in a stack should preferably be maintained within about 1%, of the average stack fuel utilization rate. The air inlet baffle may be designed in order to obtain stack temperature profiles having a slight negative slope in the vertical direction (e.g., from the bottom to the top of the stack), to thereby provide an improved vertical fuel distribution along a stack.

For example, a larger volume of apertures 552 may be located in the upper portion of the air inlet baffle than in the lower portion of the air inlet baffle 550 such that a larger amount of the heated air is provided to an upper portion of the stack 102 located above the annular air outlet 530 than to a lower portion of the stack 102 located below the annular air outlet 530, and such that the upper portion of the stack 102 is maintained at a lower temperature than the lower portion of the stack 102 and a middle portion of the stack 102 located at the level of the annular air outlet 530. Furthermore, the lower portion of the stack 102 may be maintained at a lower temperature than a middle portion of the stack 102 located at the level of the annular air outlet 530.

Figure 6:
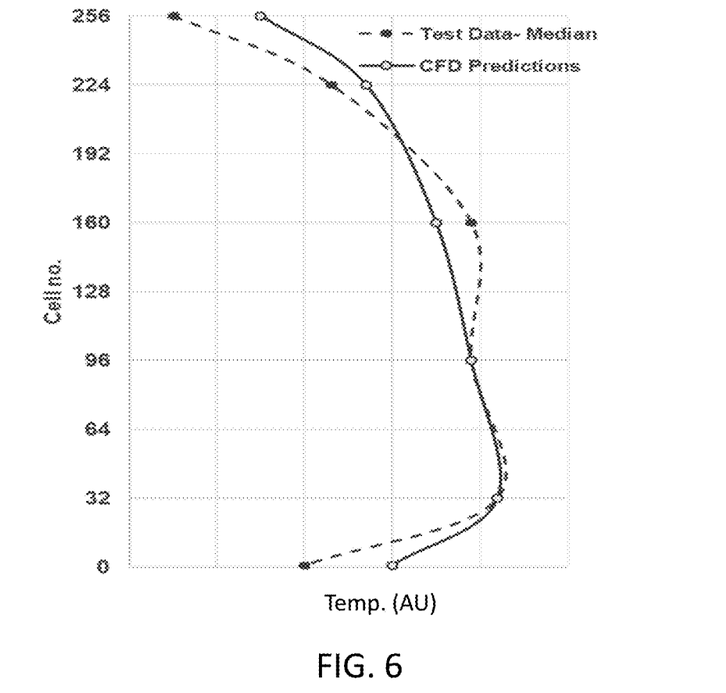
FIG. 6 is a graph showing cell fuel distribution (CFD) predicted average vertical temperature profiles, for beginning-of-life (BOL) stacks operated at 51 Amps, operated in a fuel cell system including an air inlet baffle as shown in FIG. 4A.

FIG. 6 is a graph showing average vertical temperature profiles for beginning-of-life (BOL) stacks operated at 51 Amps, when used in a fuel cell system including an air inlet baffle as shown in FIG. 4C, and a predicted vertical temperature profile based on an optimal cell fuel distribution (CFD).

Referring to FIG. 6, each tested stack included 256 sequentially numbered fuel cells, with cell 1 being disposed at the bottom of the stack and cell 256 disposed on the at the top of the stack. The temperatures of cells 1 through about cell 32 may gradually increase, such that cell 1 has the lowest temperature and cell 32 has the highest temperature. The temperatures of cells 33-224 may gradually decrease at a relatively constant rate, with cell 33 having the highest temperature and cell 224 having the lowest temperature, such that the vertical temperature gradient from cells 33 to 224 is has substantially linear, negative slope. The air inlet baffle plate was shown to provide a vertical stack temperature profile that closely matches the predicted temperature profile. As such, the air inlet baffle plate provides improved fuel distribution.

Figure 7:
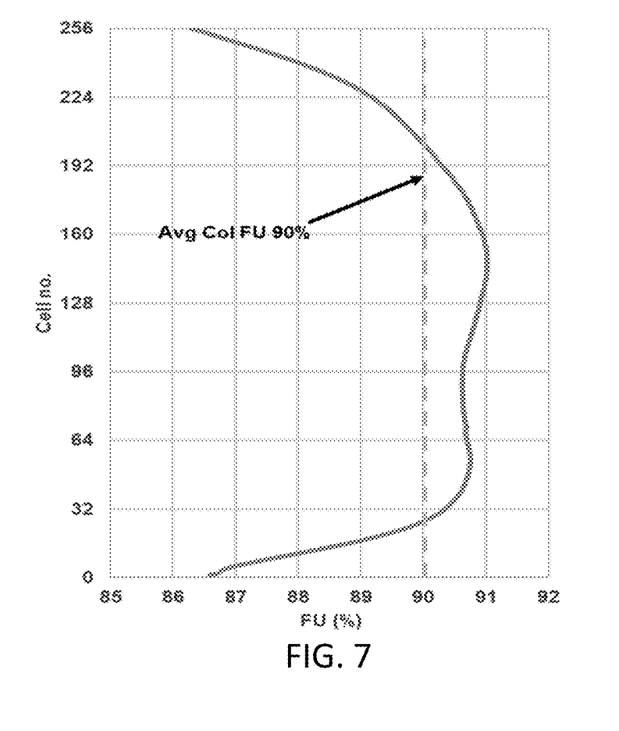
FIG. 7 is a graph showing the average vertical fuel utilization profile from CFD, corresponding to the thermal profile of the stacks tested under the 51 Amp BOL operating condition.

FIG. 7 is a graph showing the average vertical fuel utilization profile of the stacks tested under the 51 Amp BOL operating condition. Referring to FIG. 7, the graph demonstrates that the maximum fuel utilization cells in the stacks was 91%, which is within 1% of the average stack fuel utilization of 90%. Thus, the air inlet baffle design was shown to maintain a tight vertical fuel utilization spread, as well as a tight thermal distribution.

Figure 8:
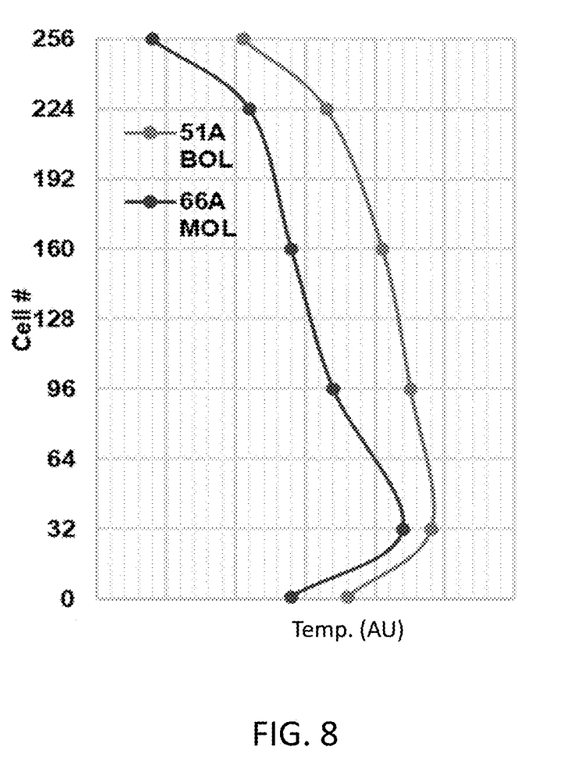
FIG. 8 is a graph showing average vertical temperature profiles for beginning-of-life (BOL) stacks operated at 51 Amps, and for middle of life (MOL) stacks operated 66 Amps (e.g., degraded cell conditions), operated in a fuel cell system including an air inlet baffle as shown in FIG. 4A.

FIG. 8 is a graph showing average vertical temperature profiles for beginning-of-life (BOL) stacks operated at 51 Amps, and for middle of life (MOL) stacks operated 66 Amps (e.g., degraded cell conditions), when used in a fuel cell system including an air inlet baffle as shown in FIG. 4C. As can be seen in FIG. 6, the air inlet baffle maintains a tight vertical thermal spread at higher currents and under degraded cell conditions. In addition, although the thermal profile shifted to lower temperatures for 66 Amp MOL operation, the slope and the nature of the temperature profile closely matches that of the 51 Amp BOL profile, and thus, is indicative of improved fuel distribution.

Fuel cell systems of the embodiments of the present disclosure are designed to reduce greenhouse gas emissions and have a positive impact on the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A fuel cell system, comprising:
a stack of fuel cells;
a cathode recuperator configured to heat air using cathode exhaust output from the stack; and
an air inlet baffle disposed between the cathode recuperator and the stack and comprising at least two rows of apertures which are separated along a vertical direction and configured to provide a heated air output from the cathode recuperator to plural areas of the stack.

2. The system of claim 1, wherein during steady-state operation of the system, the air inlet baffle is configured to control a vertical temperature profile of the stack, such that a fuel cell-to-fuel cell temperature variation is 40° C. or less.

3. The system of claim 1, wherein during steady-state operation of the system, the air inlet baffle is configured to control a vertical temperature profile of the stack, such that a maximum fuel utilization of any of the fuel cells in the stack is 1% or less above an average fuel utilization of the stack of fuel cells.

4. The system of claim 3, wherein during the steady-state operation of the system, the fuel cells have a fuel utilization ranging from 86% to 91%, and the fuel cells comprise solid oxide fuel cells.

5. The system of claim 1, wherein:
the apertures are through holes through a solid plate portion of the air inlet baffle, the apertures having a diameter ranging from 5 mm to 15 mm; and
adjacent apertures in each row are separated by a center-to-center distance ranging from 5 mm to 15 mm.

6. The system of claim 1, wherein:
the air inlet baffle is cylindrical;
the cathode recuperator comprises an annular air outlet configured to output the heated air toward the stack in a horizontal direction; and
the air inlet baffle is configured to vertically deflect the heated air output from the annular air outlet.

7. The system of claim 6, wherein:
the apertures are arranged in arrays that extend around a circumference of the air inlet baffle; and
each array comprises at least two rows of the apertures.

8. The system of claim 7, wherein:
the apertures are arranged in a first array, a second array, a third array, and a fourth array;
the first and second arrays are disposed below the annular air outlet; and
the third and fourth arrays are disposed above the annular air outlet.

9. The system of claim 8, wherein the third and fourth arrays comprise a larger number of the apertures than the first and second arrays.

10. The system of claim 6, wherein:
a solid plate portion of the air inlet baffle is located at a vertical level of the annular air outlet;
the air inlet baffle lacks any of the apertures at the vertical level of the annular air outlet; and
the solid plate portion of the air inlet baffle is configured to vertically deflect the heated air output from the annular air outlet.

11. A method of operating a fuel cell system, comprising:
providing heated air and fuel to a stack of fuel cells;
operating the stack in a steady-state mode to output a fuel exhaust and a cathode exhaust;
providing the fuel exhaust and the cathode exhaust to an anode tail gas oxidizer to oxidize the fuel exhaust;
providing an exhaust from the anode tail gas oxidizer to a cathode recuperator;
providing air to the cathode recuperator;
heating the air using the exhaust from the anode tail gas oxidizer which comprises the cathode exhaust from the stack to output the heated air from the cathode recuperator onto an air inlet baffle disposed between the cathode recuperator and the stack and comprising at least two rows of apertures which are separated along a vertical direction; and
providing the heated air through the at least two rows of apertures to plural areas of the stack.

12. The method of claim 11, wherein during the steady-state mode, the air inlet baffle controls a vertical temperature profile of the stack such that a fuel cell-to-fuel cell temperature variation is 40° C. or less.

13. The method of claim 11, wherein during the steady-state mode, the air inlet baffle controls a vertical temperature profile of the stack such that a maximum fuel utilization of any of the fuel cells in the stack is 1% or less above an average fuel utilization of the stack of fuel cells.

14. The method of claim 13, wherein during the steady-state mode operation, the fuel cells have a fuel utilization ranging from 86% to 91%.

15. The method of claim 11, wherein:
the apertures are through holes through a solid plate portion of the air inlet baffle, the apertures having a diameter ranging from 5 mm to 15 mm; and
adjacent apertures in each row are separated by a center-to-center distance ranging from 5 mm to 15 mm.

16. The method of claim 11, wherein:
the air inlet baffle is cylindrical;
the cathode recuperator comprises an annular air outlet which outputs the heated air toward the stack in a horizontal direction; and
the air inlet baffle vertically deflects the heated air output from the annular air outlet.

17. The method of claim 16, wherein:
the apertures are arranged in arrays that extend around a circumference of the air inlet baffle; and
each array comprises at least two rows of the apertures.

18. The method of claim 17, wherein:
the apertures are arranged in a first array, a second array, a third array, and a fourth array;
the first and second arrays are disposed below the annular air outlet;
the third and fourth arrays are disposed above the annular air outlet; and
the third and fourth arrays comprise a larger number of the apertures than the first and second arrays such that more heated air is provided to an upper portion of the stack than to a lower portion of the stack.

19. The method of claim 16, wherein:
a solid plate portion of the air inlet baffle is located at a vertical level of the annular air outlet;
the air inlet baffle lacks any of the apertures at the vertical level of the annular air outlet; and
the solid plate portion of the air inlet baffle vertically deflects the heated air output from the annular air outlet toward the apertures.

20. The method of claim 19, wherein:
a larger amount of the heated air is provided to an upper portion of the stack located above the annular air outlet than to a lower portion of the stack located below the annular air outlet; and
the upper portion of the stack is maintained at a lower temperature than both the lower portion of the stack and a middle portion of the stack located at the vertical level of the annular air outlet.

* * * * *

UNITED STATES PATENT AND TRADEMARK OFFICE
CERTIFICATE OF CORRECTION

| | | |
|---|---|---|
| PATENT NO. | : 11,784,329 B1 | Page 1 of 1 |
| APPLICATION NO. | : 18/055081 | |
| DATED | : October 10, 2023 | |
| INVENTOR(S) | : Nilanjana Basu et al. | |

It is certified that error appears in the above-identified patent and that said Letters Patent is hereby corrected as shown below:

On the Title Page

Item (30), should be inserted:
--FOREIGN APPLICATION PRIORITY DATA:
MAY 27, 2022 INDIA......202241030531--

Signed and Sealed this
Fifteenth Day of April, 2025

Coke Morgan Stewart
*Acting Director of the United States Patent and Trademark Office*